United States Patent
Deily

(10) Patent No.: US 8,820,764 B2
(45) Date of Patent: Sep. 2, 2014

(54) BICYCLE FRAME

(76) Inventor: Robert M Deily, Piedmont, OK (US)

(*) Notice: Subject to any disclaimer, the term of this patent is extended or adjusted under 35 U.S.C. 154(b) by 0 days.

(21) Appl. No.: 13/419,134

(22) Filed: Mar. 13, 2012

(65) Prior Publication Data

US 2013/0241172 A1    Sep. 19, 2013

(51) Int. Cl.
*B62K 3/02* (2006.01)
*B62K 3/04* (2006.01)

(52) U.S. Cl.
CPC .... *B62K 3/02* (2013.01); *B62K 3/04* (2013.01)
USPC .................................................. 280/281.1

(58) Field of Classification Search
CPC .......... B62K 3/02; B62K 25/28; B62K 25/30; B62K 25/286
USPC ............ 280/124.109, 160.1, 281.1, 284, 288, 280/288.2, 781
See application file for complete search history.

(56) References Cited

U.S. PATENT DOCUMENTS

| | | |
|---|---|---|
| 4,621,827 A | 11/1986 | Klein |
| 4,666,175 A | 5/1987 | Mueller |
| 4,846,490 A | 7/1989 | Hashimto et al. |
| 5,018,758 A | 5/1991 | Klein |
| 5,269,552 A | 12/1993 | Yelverton |
| 6,012,733 A | 1/2000 | Rafoth |
| 6,378,885 B1* | 4/2002 | Ellsworth et al. ............. 280/284 |
| 6,932,371 B2 | 8/2005 | Perez |
| 7,059,620 B2 | 6/2006 | Chaimberlain et al. |
| 2044/0239071 | 12/2004 | Chamberlain et al. |
| 2008/0054593 A1 | 3/2008 | Vroomen et al. |
| 2010/0295264 A1* | 11/2010 | Denais ......................... 280/260 |

* cited by examiner

*Primary Examiner* — Joseph M Rocca
*Assistant Examiner* — Felicia L Brittman
(74) *Attorney, Agent, or Firm* — Edward L. White

(57) ABSTRACT

A bicycle frame comprising: a head, top, down and seat tubes along with a bottom bracket; a pair of seat and lower chain stays; and a pair of upper chain stays, the upper chain stays attached to at least one frame component selected from the down tube, the seat tube, and the bottom bracket, whereby, the addition of the upper chain stays adds rigidity to the frame to resist torque forces applied to the bottom bracket.

1 Claim, 2 Drawing Sheets

BICYCLE FRAME

CROSS-REFERENCE TO RELATED APPLICATIONS

None.

FIELD OF THE INVENTION

The invention relates to bicycle frames, and more particularly, to frames intended to resist torque forces applied through bicycle pedals.

SUMMARY OF THE INVENTION

The invention relates to bicycle frames. Bicycle frames typically have a construction where there is a front portion that is substantially triangular in shape terminating at one end in what is known as a head tube that attaches to a mechanism affixed to the front wheel of a bicycle and allowing for the handlebars of the bicycle to turn the front wheel as the rider desires. Another end the front triangle attaches to what is typically called a seat tube. Extending backwardly from the seat tube is a second triangle that terminates at a back end thereof with drop outs which engage the back wheel of the bicycle built.

At the bottom of the frame is a bottom bracket through which the pedals pass. The force the rider generates when turning the pedals is transmitted to the frame through the bottom bracket. Thus, there is a great deal of torque applied to the bottom bracket which tends to flex the frame. Prior designs have at least one of their objectives increasing the stiffness of the frame to resist the torsional forces applied to the bottom bracket through the pedals.

In general, prior frames were comprised of a first triangular assembly having a top tube and a down tube affixed to a head tube. The head tube is the part of a frame through which the force passes in a rotatable fashion to allow the handlebars to turn the front wheel of the bike. The top tube and the down tube may affix to the head tube at a point directly adjacent to one another. In a small minority of prior frames, one of the items of the top tube and the down tube was not actually affixed to the head tube, but one of either the top tube was affixed to the down tube which then engages the head tube or, alternatively, the down tube was attached to the head tube with the top tube engaging the down tube directly and not engaging the head tube. However, in the majority of bikes, the top tube and the down tube both engage the head tube. Either of the foregoing configurations are intended to be incorporated within the scope of the present invention.

Extending backwardly from the head tube are the top tube and the down tube, and they terminate at the point where there are affixed to the seat tube and/or the bottom bracket. In a typical prior art configuration, the down tube affixes to the bottom bracket, but it may be affixed, in whole or part, to the seat tube as well. The top tube is affixed to the seat tube. Thus, the seat tube, the top tube and the down tube form a first substantially triangular assembly, with the requirement of a strict triangle knot always accurate since the connection point for the top tube and the down tube at the head tube may be some distance apart. Extending further back from the seat tube is a pair of seat stays extending downward from a point at or near the point where the top tube engages the seat tube. Also extending back from the bottom bracket is a chain stay. Typically, there is a pair of chain stays. It is also typical for the chain stays and the seat stays meet at the drop outs which receive the back wheel for the bike. In the present invention, the terminology will be used of intersections relating to which tubes meet which frame components meet other frame components at or near that point. A first intersection is the point at which the head tube meets the top tube and the down tube. The intersection of the top tube and the down tube with the head tube may be very close together or they may be spaced some distance apart. The second intersection includes the down tube, the bottom bracket, the seat tube, and the chain stays. The third intersection is where the top tube engages the seat tube and which is adjacent to the point where the seat stays extend backwardly from the seat tube. Again, the point where the top tube and the seat stays engage the down tube may be directly adjacent to one another or they may be offset some distance. There is a fourth intersection where the seat stays and the chain stays meet. This fourth intersection has two parts that are split apart to receive the bicycle wheel there between. However, the fourth intersection will be referred to as a single area. It is a location on the frame where the rear wheel of a bike engages the frame, the actual point of contact being the drop outs.

Among the improvements to the present invention are multiple attachment points for the chain stays at the second intersection. In a preferred embodiment of the present invention, there is a pair of upper chain stays and a pair of lower chain stays. As is typical in bike frames, the lower chain stays meet the bottom bracket and are affixed thereto. A supplemental component is the addition of the upper chain stays which run substantially parallel to the lower chain stays, but which are spaced apart therefrom. The upper chain stays are affixed at one end to the drop outs, but at the other end they are affixed to at least one of the following components, the seat tube, the down tube, and the bottom bracket. In preferred embodiment, the upper chain stays are affixed to all three of the foregoing components, that is, to the seat tube, the down tube and the bottom bracket. The attachment of the upper chain stay to the down tube is called a first attachment point. The attachment of the upper chain stay to the bottom bracket is called a second attachment point, and the attachment of the upper chain stay to the seat tube is called a third attachment point. These three attachment points in a preferred embodiment serve to stiffen the frame and provide additional resistance for the present frame to the torque forces applied by the pedals to the bottom bracket.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION OF THE INVENTION

Figure 1:
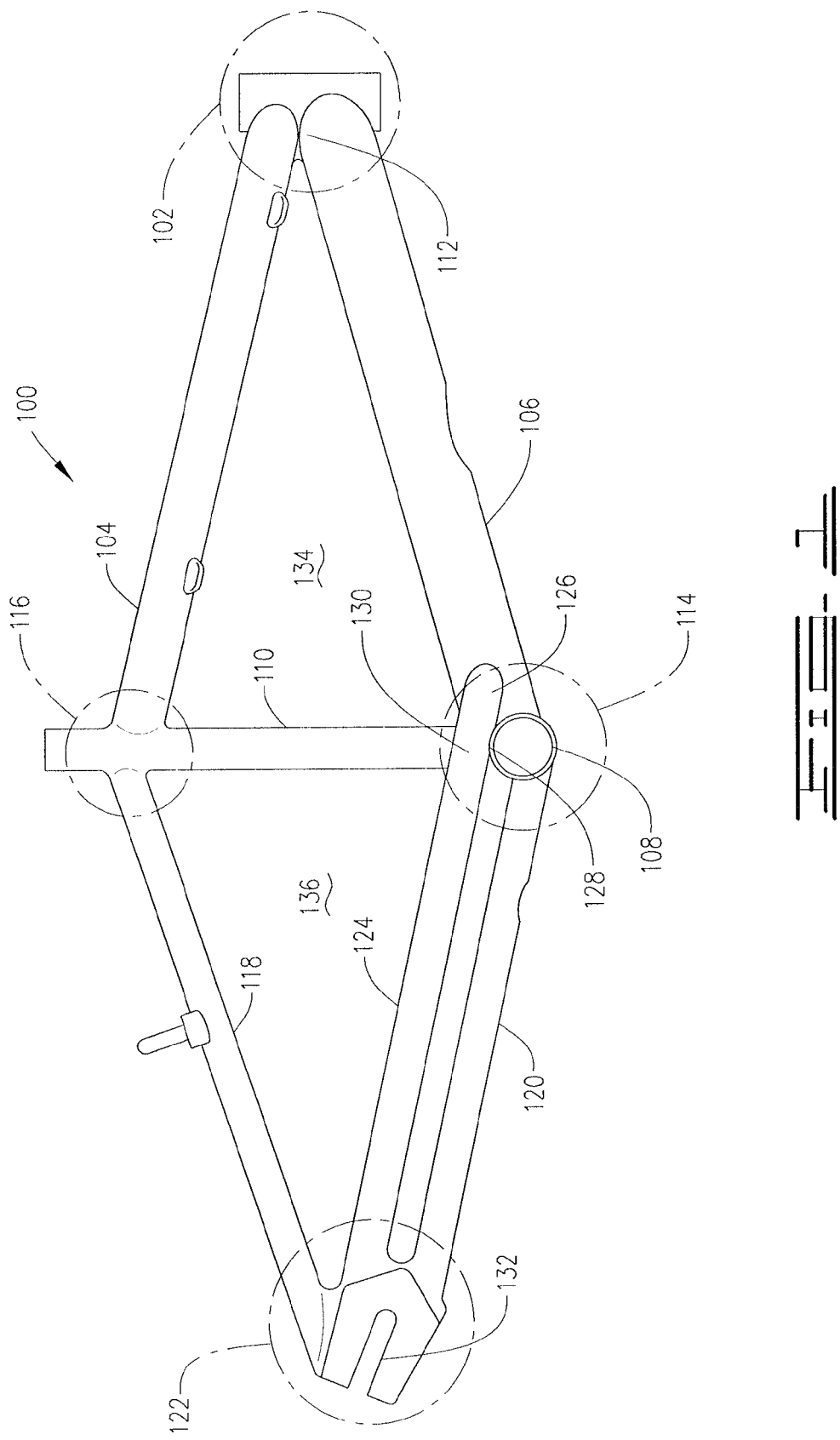
FIG. 1 is a side view of a frame according to the present invention.

FIG. 1 shows a frame 100 according to the present invention. The frame 100 is comprised of two substantially triangular assemblies. A first substantially triangular assembly 134 is defined by a head tube 102, a top tube 104, a down tube 106 and a seat tube 110 along with a bottom bracket 108 situated at or near the junction of the down tube 106 with the seat tube 110. The first substantially triangular assembly 134 involves connection of the top tube 104 and the down tube 106 to the head tube 102, and this junction is referred to as a first intersection 112. The top tube 104 and the down tube 106 may connect to the head tube 102 directly adjacent to one another or they may be spaced some distance apart. If they are spaced some distance apart, the frame component defined thereby is not strictly speaking a triangle, but it is a substantially triangular assembly. Further, the joinder of the tubes, usually by some kind of welding, may result in some curvature of their intersection making the shape not, strictly speaking triangular.

The seat tube 110 and the down tube 106 meet at or near the bottom bracket 108, and this intersection point is referenced as the second intersection 114. The bottom bracket 108 is the component through which pedals pass and which bear the torque force associated with their operation. The seat tube 110 extending upwardly from the bottom bracket 108 engages the top tube 104 at a third intersection 116. The foregoing components form the first substantially triangular assembly 134.

A second substantially triangular assembly 136 is defined by the seat tube 110, the lower chain stays 120, and the seat stays 118. The pairs of lower chain stays 120 and seat stays 118 each pass on either side of a rear tire of a bicycle disposed therebetween. The lower chain stay 120 and the seat tube 110 meet at the second intersection 114 at or near the bottom bracket 108. The seat tube 110 and the seat stays 118 meet at a third intersection 116 adjacent to where the top tube 104 meets the seat tube 110. The seat stays 118 and the lower chain stays 120 meet at the drop outs 132. The drop outs 132 are adapted to receive the rear tire of the bicycle. Together the lower chain stay 120, the seat tube 110 and the seat stays 118 form a second substantially triangular assembly 136. The triangle may not be perfect shape because the drop outs 132 may have various configurations which make the shape again not strictly speaking a triangle.

A second set of chain stays, referred to as upper chain stays 124 are shown. They are disposed inside of the second substantially triangular assembly 136. At one end the upper chain stays 124 engage the drop outs 132, and at the other end they engage at least one of the following bicycle frame components: the seat tube 110, the bottom bracket 108, and the down tube 106. In preferred embodiment all three of those components are engaged by the upper chain stays 124 at the second intersection 114. The first attachment point 126 connects the upper chain stays 124 to the down tube 106. The second attachment point 128 attaches the upper chain stays 124 to the bottom bracket 108, and the third attachment point 130 attaches the upper chain stays 124 to the seat tube 110. One or more of the attachment points may not be provided in a configuration, but they are preferably all provided to provide maximum stability to the frame 100.

Figure 2:
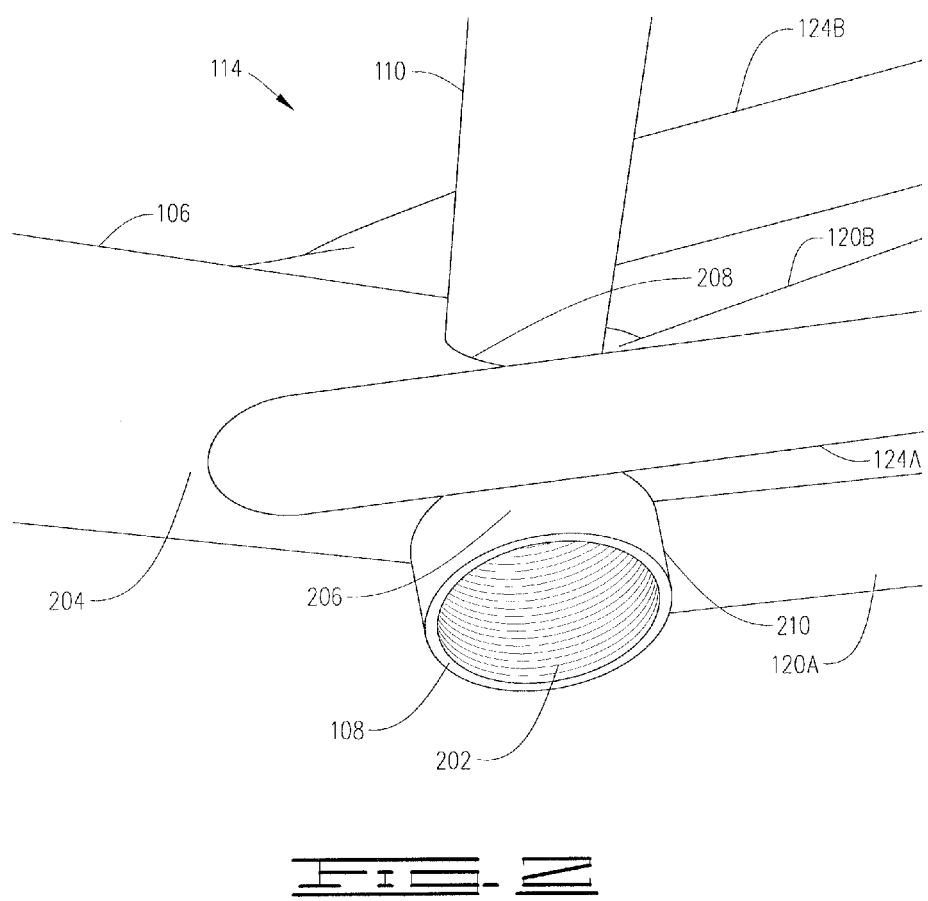
FIG. 2 is a detailed view of a second intersection according to the present invention.

FIG. 2 shows the attachment of the upper chain stays 124 and the lower chain stays 120 in greater detail. The area shown in detail in FIG. 2 is the second intersection 114. At the second intersection 114 the down tube 106, the bottom bracket 108, and the seat tube 110 meet, and those components can be seen in FIG. 2. Since it is a closer view, the pedal threads 202 can also be seen. Also, since FIG. 2 is in perspective, both upper chain stays 124A and 124B can be seen as can both lower chain stays 120A and 120B. Three upper chain stay attachment points can be seen: (a) a first upper chain stay attachment point 204, which is where the upper chain stay 124A is affixed to the down tube 106; (b) as second upper chain stay attachment point 206, which is where the upper chain stay 124A is affixed to the bottom bracket 108; and (c) a third upper chain stay attachment point 208, which is where the upper chain stay 124A is affixed to the seat tube 110. Also, the lower chain stay attachment point 210 can be seen, which is where the lower chain stay 120A is affixed to the bottom bracket 108.

The purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

While the invention has been shown, illustrated, described and disclosed in terms of specific embodiments or modifications, the scope of the invention should not be deemed to be limited by the precise embodiments or modifications therein shown, illustrated, described or disclosed. Such other embodiments or modifications are intended to be reserved especially as they fall within the scope of the claims herein appended.

Having thus described the invention, I claim:

1. A bicycle frame comprising:
   a. a head tube;
   b. a top tube;
   c. a down tube;
   d. a bottom bracket;
   e. a seat tube, the top tube, and the down tube defining a first substantially triangular assembly in which the top and down tube are affixed to the head tube at a first intersection, the seat tube and down tube are affixed to the bottom bracket at a second intersection, and the top tube is affixed to the seat tube at a third intersection;
   f. a pair of seat stays;

g. a lower pair of chain stays, the seat tube, seat stays, and lower chain stays defining a second substantially triangular assembly in which the seat stays are affixed to the seat tube at the third intersection, and the lower chain stays and down tube are affixed to the bottom bracket at the second intersection;

h. a pair of upper chain stays affixed to the down tube at first attachment points, the seat tube at second attachment points, and the bottom bracket at third attachment points, whereby, the addition of the upper chain stays adds rigidity to the frame to resist torque forces applied to the bottom bracket.

\* \* \* \* \*